US006617020B2

(12) United States Patent
Zhou et al.

(10) Patent No.: US 6,617,020 B2
(45) Date of Patent: Sep. 9, 2003

(54) HOT MELT PROCESSABLE PRESSURE SENSITIVE ADHESIVE COMPRISING ORGANOPHILIC CLAY PLATE-LIKE PARTICLES, A METHOD OF MAKING, AND ARTICLES MADE THEREFROM

(75) Inventors: Zhiming Zhou, Woodbury, MN (US); JingJing Ma, Woodbury, MN (US); James R. Peterson, St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/826,128

(22) Filed: Apr. 4, 2001

(65) Prior Publication Data

US 2003/0021989 A1 Jan. 30, 2003

(51) Int. Cl.[7] .............................. B32B 15/04; B32B 7/12
(52) U.S. Cl. .................. 428/355 R; 428/343; 428/356; 428/355 RA; 428/355 EN; 428/355 BL; 428/355 CN; 428/355 N
(58) Field of Search .............................. 428/343, 355 R, 428/356, 355 RA, 355 EN, 355 BL, 355 CN, 355 N

(56) References Cited

U.S. PATENT DOCUMENTS

| 2,532,011 A | | 11/1950 | Dahlquist et al. | |
|---|---|---|---|---|
| RE24,906 E | | 12/1960 | Ulrich | |
| 4,329,384 A | | 5/1982 | Vesley et al. | |
| 4,330,590 A | | 5/1982 | Vesley et al. | |
| 4,517,112 A | * | 5/1985 | Mardis et al. | 516/100 |
| 4,699,938 A | * | 10/1987 | Minamizaki et al. | 524/271 |
| 5,209,971 A | | 5/1993 | Babu et al. | |
| 5,253,461 A | | 10/1993 | Janoski et al. | |
| 5,296,547 A | | 3/1994 | Nestegard et al. | |
| 5,300,291 A | | 4/1994 | Sablotsky et al. | |
| 5,306,745 A | * | 4/1994 | Herran et al. | 523/205 |
| 5,354,597 A | * | 10/1994 | Capik et al. | 428/152 |
| 5,393,787 A | | 2/1995 | Nestegard et al. | |
| 5,421,876 A | | 6/1995 | Janoski | |
| 5,644,007 A | | 7/1997 | Davidson et al. | |
| 5,681,654 A | | 10/1997 | Mamish et al. | |
| 5,725,876 A | | 3/1998 | Mantelle et al. | |
| 5,804,610 A | | 9/1998 | Hamer et al. | |
| 5,914,157 A | * | 6/1999 | Munson et al. | 427/516 |

FOREIGN PATENT DOCUMENTS

| JP | 7-90229 | 4/1995 |
|---|---|---|
| JP | 8-245927 | 9/1996 |
| JP | 10-17840 | 1/1998 |

OTHER PUBLICATIONS

ASTM D5403–93.
ASTM D3654–88.
ASTM D3330–90.
ASTM D3330–87.
ASTM D2857–93.

* cited by examiner

*Primary Examiner*—James J. Seidleck
*Assistant Examiner*—Travis B Ribar
(74) *Attorney, Agent, or Firm*—Scott R. Pribnow

(57) ABSTRACT

The invention relates to a hot melt processable pressure sensitive adhesive comprising at least one elastomer, organophilic clay plate-like particles, and at least one non-volatile organophilic exfoliating agent. Also disclosed are articles prepared therefrom and methods pertaining thereto.

24 Claims, No Drawings

HOT MELT PROCESSABLE PRESSURE SENSITIVE ADHESIVE COMPRISING ORGANOPHILIC CLAY PLATE-LIKE PARTICLES, A METHOD OF MAKING, AND ARTICLES MADE THEREFROM

FIELD OF THE INVENTION

The invention relates to a hot melt processable pressure sensitive adhesive comprising organophilic clay plate-like particles, articles prepared therefrom, and a method of making the pressure sensitive adhesive.

BACKGROUND OF THE INVENTION

Pressure sensitive adhesives (PSAs) have found use in a variety of applications. PSAs are well known to those of ordinary skill in the art to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs are polymers designed and formulated to exhibit the requisite viscoelastic properties resulting in a desired balance of tack, peel adhesion, and shear strength. Obtaining the proper balance of properties is not a simple process.

PSAs with performance features are needed that can withstand demanding environments, such as elevated temperatures. The desired performance features can include good peel adhesion, good shear strength, and clean removability.

Additionally, environmental concerns about the use of solvents in the processing of PSAs has led to increased emphasis on solventless processing methods such as hot melt processing. Hot melt processability, however, restricts the polymers that can be used in PSA formulations. For example, crosslinked polymers that have high shear strength are generally not hot melt processable. Accordingly, to otherwise enhance shear strength of a hot-melt processable PSA, some have explored the use of thermoplastic elastomers in such PSA formulations and/or crosslinking the compositions after coating. Nevertheless, these approaches are sometimes limited in the performance characteristics that they are able to achieve.

SUMMARY OF THE INVENTION

A need therefore exists for alternative hot melt processable pressure sensitive adhesive (PSA) compositions. A need also exists for hot melt processable PSA compositions that preferably exhibit good high temperature shear strength and good high temperature peel strength, as well as clean removability from an adherend.

In one embodiment, the composition of the invention comprises: (a) at least one elastomer; (b) organophilic clay plate-like particles; and (c) at least one non-volatile organophilic exfoliating agent. The composition is a hot melt processable PSA. In a further embodiment, the organophilic clay plate-like particles are oriented.

The PSA composition of the invention demonstrates good high temperature shear strength in one embodiment. The PSA composition of the invention demonstrates good high temperature peel strength in a further embodiment. The PSA composition of the invention also demonstrates clean removal from an adherend in a further embodiment. Ideally, the PSA composition of the invention also demonstrates good cohesive strength. Good cohesive strength provides a combination of good shear resistance, good peel strength, and clean removability.

The term "non-volatile," as used herein, refers to those exfoliating agents that generate less than about three weight percent VOC (volatile organic content) when the exfoliating agent is exposed to a temperature of about 110° C. ±5° C. in a forced draft oven for one hour according to ASTM Test Method DS403-93.

The term "organophilic clay," as used herein, refers to a clay that has been surface-modified to convert at least a portion of its surface nature from an organophobic state to an organophilic state (preferably to a hydrophobic state). For example, in one embodiment, a clay may initially have both organophobic and organophilic sites. However, upon modification according to the present invention, at least a portion of the organophobic sites are converted to organophilic sites. In other embodiments, a clay initially contains essentially only organophobic sites and, upon modification according to the present invention, at least a portion of the organophobic sites are converted to organophilic sites. Preferably, at least about 50% of exchangeable cations on the unmodified organophilic clay are exchanged with organophilic modifying cations.

The term "organophilic exfoliating agent," as used herein, refers to an organophilic material capable of separating an organophilic clay sheet into plate-like particles and maintaining the clay in plate-like particles at the use temperature (typically room temperature, i.e., about 21° C.).

The term "solventless," as used herein, refers to compositions that are essentially 100 percent solid systems (i.e., systems essentially free of VOC and water). Typically, such compositions have no more than about five weight percent VOC and water, more typically no more than about three weight percent VOC and water. Most typically, such compositions are free of VOC and water.

The term "hot melt processable," as used herein, refers to a composition that can transform, for example, by heat and pressure from a solid to a viscous fluid. The composition should be capable of being hot melt processed without being such that the composition chemically transforms, rendering it unusable for the intended application. Typically, hot melt processable compositions are solventless.

The term "oriented," as used herein, refers to plate-like particles being positioned in a non-random manner. One skilled in the art would typically be able to observe a composition and determine if the plate-like particles were oriented and, if so, whether or not the plate-like particles were uniaxially or biaxially oriented. In a biaxially oriented system, typically the major surfaces of a majority of the plate-like particles are roughly parallel. This may be the case, for example, for a film that has been stretched in both the x-direction and y-direction. In an uniaxially oriented system, typically a majority of the plate-like particles are aligned via their largest dimension (i.e., their length) roughly in parallel. For example, this would be the y-direction (or "down-web" direction) in the case of a film extruded onto a web and stretched in the y-direction.

DETAILED DESCRIPTION OF THE PREFERRED EMBODIMENTS OF THE INVENTION

The hot melt processable pressure sensitive adhesive (PSA) composition of the present invention comprises at least one elastomer, organophilic clay plate-like particles, at least one non-volatile organophilic exfoliating agent, and optional additives.

Elastomers

An elastomer should be selected that is hot melt processable in order that the composition of the invention be hot melt processable. Hot melt processable elastomers include certain conventional elastomers as well as certain thermoplastic elastomers. These hot melt processable elastomers are typically linear or branched polymers with little or no crosslinking. The composition of the invention typically comprises about 25 to about 98 percent by weight of elastomer based on the total weight of the composition.

Conventional Elastomers

Useful conventional elastomers typically form one phase at about 21° C. and have a glass transition temperature of less than about 20° C. (more typically less than about 0° C.) in addition to exhibiting elastomeric properties. Examples of conventional elastomers that are useful in the present invention include, but are not limited to, natural and synthetic rubbers, polyvinyl ethers, poly(meth)acrylates, polyurethanes, poly-α-olefins, silicones, and combinations thereof.

Natural rubber elastomers useful for formulation as PSAs generally contain masticated natural rubber. Natural rubber may range in grade from a light pale crepe grade to a darker ribbed smoked sheet grade. Representative examples include CV-60 from Goodyear Tire and Rubber Co.; Akron, Ohio, which is a controlled viscosity rubber grade, and SMR-5 from Cargill Inc.; Ontario, N.Y., which is a ribbed smoked sheet rubber grade. Natural rubbers are generally non-tacky and are, therefore, typically formulated with tackifying resins to form PSAs. Other additives, such as antioxidants, are also frequently added to PSA formulations based on natural rubbers.

Useful synthetic rubbers may be either tacky or non-tacky. Synthetic rubber elastomers include, for example, butyl rubber (a copolymer of isobutylene and less than about three weight percent isoprene); polyisobutylene; polyisoprene; polybutadiene; and styrene/butadiene rubber. A specific example of a synthetic rubber is AMERIPOL 101 IA, a styrene/butadiene rubber available from B F Goodrich Co.; Charlotte, N.C.

Polyvinyl ether elastomers are generally employed as blends of homopolymers of different vinyl ethers (e.g., vinyl methyl ether, vinyl ethyl ether, or vinyl isobutyl ether), or blends of homopolymers of vinyl ethers and copolymers (i.e., those polymers derived from at least two chemically different monomers) of vinyl ethers, such as, for example, with (meth)acrylates. Depending upon the degree of polymerization, the homopolymers may be viscous oils, tacky soft resins, or rubber-like substances. Polyvinyl ether elastomers include, for example, those based on vinyl methyl ether, such as LUTANOL M 40, available from BASF Corp.; Mount Olive, N.J., and GANTREZ M 574 and GANTREZ M 555, available from ISP Technologies, Inc.; Wayne N.J.; vinyl ethyl ether, such as LUTANOL A 25, LUTANOL A 50, and LUTANOL A 100, available from BASF Corp.; Mount Olive, N.J.; vinyl isobutyl ether such as LUTANOL 130, LUTANOL 160, LUTANOL IC, LUTANOL I 60D, and LUTANOL I 65D, available from BASF Corp.; Mount Olive, N.J.; and a terpolymer of methacrylate/vinyl isobutyl ether/acrylic acid, such as ACRONAL 550 D, available from BASF Corp.; Mount Olive, N.J.

Poly(meth)acrylate elastomers generally have a glass transition temperature of about −20° C. or less. Frequently, these elastomers are copolymers and may comprise, for example, from about 80 to about 100 weight percent of a $C_3$–$C_{12}$ alkyl ester component such as, for example, isooctyl acrylate, 2-ethyl-hexyl acrylate, and/or n-butyl acrylate, and from about 0 to about 20 weight percent of a polar component, such as, for example, (meth)acrylic acid, ethylene vinyl acetate, N-vinyl pyrrolidone, and/or styrene macromer. The polyacrylate elastomers may be tacky or non-tacky.

The elastomer may comprise a polyurethane elastomer. A representative example of a useful polyurethane elastomer is polyoctadecyl carbamate, which is described in U.S. Pat. No. 2,532,011.

Poly-α-olefin elastomers, also referred to as poly(1-alkene) elastomers, can be any suitable poly-α-olefin, so long as the material has elastomeric properties. Generally such elastomers comprise an uncrosslinked polymer, which may have radiation activatable functional groups grafted thereon as described in U.S. Pat. No. 5,209,971. The poly-α-olefin elastomer may be tacky or non-tacky. If uncrosslinked, the inherent viscosity of the polymer is generally between about 0.7 dL/g and about 5 dL/g as measured according to ASTM D 2857-93, "Standard Practice for Dilute Solution Viscosity of Polymers." In addition, the polymer generally is predominantly amorphous. Useful poly-α-olefin elastomers include, for example, $C_3$–$C_{18}$ poly (1-alkene) homopolymers and copolymers of propylene with $C_5$–$C_{12}$ 1-alkenes. Preferred poly-α-olefin elastomers include, for example, $C_5$–$C_{12}$ poly(1-alkene) polymers and copolymers of propylene with $C_6$–$C_8$ 1-alkenes.

Silicone elastomers are typically polydimethylsiloxane or polydimethyldiphenylsiloxane polymers that contain residual silanol functionality (SiOH) on the ends of the polymer chain or block copolymers comprising polydiorganosiloxane segments and urea-terminated segments.

Thermoplastic Elastomers

Thermoplastic elastomers exhibit elastomeric properties at room temperature (i.e., about 21° C.), but exhibit thermoplastic properties at elevated temperatures at which they can be molded. Representative examples thereof include styrenic block copolymers (such as styrene-diene block copolymers), polyolefins, polyurethanes, polyesters, and combinations thereof.

Styrene-diene block copolymer elastomers are generally of the A–B or [A–B]$_n$ type, where A represents a thermoplastic polystyrene block and B represents a rubbery block of polyisoprene, polybutadiene, or one of their hydrogenated versions, such as poly(ethylene/butylene) or poly(ethylene/propylene). Examples of specific styrene-diene block copolymers include, but are not limited to, linear, radial, and tapered styrene-isoprene block copolymers, such as KRATON D 1107, available from Shell Chemical Co.; Houston, Tex. and EUROPRENE SOL TE 9110, available from EniChem Elastomers Americas, Inc.; Houston, Tex.; linear styrene-(ethylene-butylene) block copolymers, such as KRATON G1657, available from Shell Chemical Co.; Houston, Tex.; linear styrene-(ethylene/propylene) block copolymers, such as KRATON G 1750X, available from Shell Chemical Co.; Houston, Tex.; butadiene block copolymers, such as KRATON D 1118, available from Shell Chemical Co.; Houston, Tex., and EUROPRENE SOL TE 6205, available from EniChem Elastomers Americas, Inc.; Houston, Tex.; and radial asymmetric styrene-isoprene block copolymers as described in U.S. Pat. Nos. 5,393,787 and 5,296,547. The polystyrene blocks tend to form domains in the shape of spheroids, cylinders, or lamellae that cause the block copolymer to have two phases.

Polyolefin thermoplastic elastomers are available, for example, from DuPont-Dow Elastomers; Wilmington, Del.

under the tradename of ENGAGE. Specific examples thereof include ENGAGE 8150, ENGAGE 8180, ENGAGE 8100, ENGAGE 8452, ENGAGE 8445, ENGAGE 8480, ENGAGE 8490, ENGAGE 8200, and ENGAGE 8840.

Organophilic Clays

Organophilic clay is obtainable by modifying a hydrophilic clay such that the clay is organophilic. Conventional hydrophilic clays are generally not able to be adequately exfoliated according to the present invention. Thus, the present invention utilizes organophilic clays to achieve a higher degree of exfoliation in the clay.

The hydrophilic clay to be modified can be any phyllosilicate or other clay that has a sheet-like structure. Examples thereof include, but are not limited to, hydrated aluminum silicate, kaolinite, atapulgite, illite, halloysite, beidelite, nontronite, hectorite, hectite, bentonite, saponite, and montmorillonite. The smectite clays such as, for example, beidelite, nontronite, hectorite, hectite, bentonite, saponite, and montmorillonite are preferred.

The organophilic clays useful for the invention may be prepared from commercially available hydrophilic clays. The following is an example of a method of preparing organophilic clay:

The hydrophilic clay is stirred and dissolved in water to form an exfoliated hydrophilic clay solution. Then, depending on the clay, exchangeable ions (e.g., sodium or calcium ions), for example, of the hydrophilic clay are exchanged with organophilic modifying cations. Typical organophilic modifying cations comprise onium cations. For example, such cations include, but are not limited to, $C_2$ to $C_{60}$ alkyl primary, secondary, tertiary, and quaternary ammonium cations and quaternary phosphonium cations. Examples thereof include, but are not limited to, (meth)acrylate ammonium cations, such as 2-(dimethylammonium)ethyl methacrylate cations, octadecylammonium cations, dimethyl dihydrogenated tallow ammonium cations, thiol group functionalized alkyl ammonium cations, and combinations thereof. Exchange of the hydrophilic clay ions with organophlic modifying cations causes the modified clay to precipitate from the water solution. The precipitated clay (which is no longer in an exfoliated state) is then dried to remove excess water.

Some organophilic clays are commercially available. For example, organophilically-modified montmorillonite is available as SCPX CLOISITE 20A, SCPX CLOISITE 15A, SCPX CLOISITE 10A, SCPX CLOISITE 6A, SCPX CLOISITE 30b, and SCPX CLOISITE 2398 from Southern Clay Products; Gonzalez, Tex., and under the trade designation, NANOMER, from Nanocor Inc.; Arlington Heights, Ill.

The composition of the invention typically comprises any suitable amount of organophilic clay. Generally, the amount of organophilic clay present is such that the overall composition is a pressure sensitive adhesive. Preferably the composition includes about 1 to about 40 weight percent of the organophilic clay plate-like particles, more preferably about 1 to about 20 weight percent, and most preferably 1 to about 10 weight percent based on the total weight of the composition. The exact amount varies depending on, for example, the type of elastomer and the presence and amount of other components in the composition.

Non-Volatile Organophilic Exfoliating Agents

The composition of the invention typically comprises about 1 to about 75 weight percent of a non-volatile organophilic exfoliating agent based on the total weight of the composition. A non-volatile organophilic exfoliating agent is used to exfoliate the organophilic clay. It has been found that the organophilic clay can be easily exfoliated by exfoliating agents, that are low molecular weight resins. Examples of useful low molecular weight resins include, but are not limited to, tackifying agents and low molecular weight block copolymers such as styrene-isoprene block copolymers, styrene-butadiene block copolymers, and hydrogenated block copolymers. Such exfoliating agents typically have a number average molecular weight of less than about 20,000 g/mol, preferably less than about 10,000 g/mol, and most preferably less than about 5,000 g/mol.

Tackifying agents are the preferred exfoliating agents. However, not all tackifying agents will act as an exfoliating agent in any given system. For a tackifying agent to function as an exfoliating agent according to the present invention, it generally needs to be viscous enough to impart shear forces in the composition upon exfoliation in order to effectively exfoliate the organophilic clay. It is also preferred that such a tackifying agent would minimize or prevent substantial agglomeration of the exfoliated particles. Selecting a tackifying agent in which the organophilic clay is compatible helps to accomplish this preferred embodiment. Suitable tackifying agents can be found in the following groups: aliphatic, aromatic-modified aliphatic, aromatic, and at least partially hydrogenated versions and derivatives thereof.

Examples of tackifying agents that are useful as exfoliating agents include, but are not limited to, rosins, such as wood rosins and their hydrogenated derivatives; derivatives of rosins, such as FORAL 85, a stabilized rosin ester from Hercules Chemical Co.; Wilmington, Del., the SNOWTACK series of gum rosins from Tenneco Corp.; Greenwich, Conn., and the AQUATAC series of tall oil rosins from Arizona Chemical Co.; Panama City, Fla.; terpene resins of various softening points, such as α-pinene and β-pinene, available as PICCOLYTE A-115 and ZONAREZ B-100 from Arizona Chemical Co.; Panama City, Fla.; petroleum-based resins, such as the ESCOREZ 1300 series of aliphatic olefin-derived resins and the ESCOREZ 2000 series of aromatic/aliphatic olefin-derived resins from Exxon Chemical Co.; Houston, Tex.; and synthetic hydrocarbon resins, such as the PICCOLYTE A series of aromatic resins such as PICCOTEX LC-55WK; and aliphatic resins, such as PICCOTAC 95, available from Hercules Chemical Co.; Wilmington, Del.

Particularly preferred are resins derived by polymerization of $C_5$ to $C_9$ unsaturated hydrocarbon monomers, polyterpenes, synthetic polyterpenes and the like. Examples of such commercially available resins of this type are WINGTACK PLUS tackifying agents, available from Goodyear Tire and Rubber Co.; Akron, Ohio; REGALREZ 1126 tackifying agents, available from Hercules Chemical Co.; Wilmington, Del.; and ESCOREZ 180, ESCOREZ 1310, and ESCOREZ 2393 tackifying agents, all available from Exxon Chemical Co.; Houston, Tex.

Additives

Additives may optionally be included in the PSA composition of the invention. The type and amount of additives depend on, for example, the nature of the elastomer, clay plate-like particles, and exfoliating agent. Examples of additives include, but are not limited to, general tackifying agents, plasticizers, antioxidants, pigments, curing agents, adhesion promoting agents, and combinations thereof.

Tackifying Agents

In some cases, the non-volatile organophilic exfoliating agent may serve to tackify the elastomer. The composition of the invention typically comprises about 0 to about 75 weight percent, preferably about 0 to about 60 weight percent, and most preferably about 0 to about 50 weight percent of a tackifying agent based on total weight of the composition. The aforementioned weight percentages with respect to tackifying agents include those tackifying agents that are also exfoliating agents in addition to those that are not.

Adhesion Promoting Agents

An adhesion promoting agent may optionally be included in the composition of the invention. Adhesion promoting agents are materials that improve the bonding of the PSA to a substrate. Examples of useful adhesion promoting agents include, but are not limited to, those selected from trimethylolpropane (TMPTA), hexanediol diacrylate (HDDA), and pentaerythritol acrylate (PETA).

Preferably, the composition comprises about 0 to about 10 weight percent of an adhesion promoting agent (more typically about 0.1 to about 10 weight percent, if included) based on the total weight of the composition, preferably about 0 to about 5 weight percent, and most preferably about 0 to about 2 weight percent.

Preparation of Hot Melt Processable PSAs

Mixing can typically be done by any method that results in a substantially homogeneous distribution of the components. The composition of the invention is typically prepared by melt mixing the components in a molten or softened state using devices that provide dispersive mixing, distributive mixing, or a combination thereof. Both batch and continuous methods of mixing may be used. Examples of batch methods include internal mixing and roll milling. Examples of continuous methods include single screw extruding, twin screw extruding, disk extruding, reciprocating single screw extruding, and pin barrel single screw extruding. Continuous methods can utilize distributive elements, pin mixing elements, static mixing elements, and dispersive elements such as MADDOCK mixing elements and SAXTON mixing elements.

It is difficult to exfoliate organophilic clay by hot melt mixing clay with elastomer only. It has been found that hot melt processing of the organophilic clay directly with an elastomer leads to limited exfoliation of the organophilic clay, leaving many clay aggregates or sheets. Therefore, an exfoliating agent is utilized according to the present invention.

Several different sequences may be used to mix the elastomer, organophilic clay, exfoliating agent, and optional additives when preparing the hot melt processable PSA composition of the invention. The elastomer, organophilic clay, exfoliating agent, and optional additives can, for example, be simply mixed while heating under shear forces, such as in an extruder or a mixer such as a BRABENDER mixer (commercially available from C. W. Brabender Co.; South Hackensack, N.J.) or a BANBURY mixer. If the composition is prepared in a mixer, rather than an extruder, it can subsequently be transferred to an extruder. Alternatively, a master batch of pre-exfoliated organophilic clay can be prepared by mixing the organophilic clay and exfoliating agent while heating under shear conditions. This master batch can then be mixed with the elastomer to form the hot melt processable PSA composition.

A master batch of pre-exfoliated organophilic clay can be prepared, for example, by compounding the organophilic clay and exfoliating agent in a twin screw extruder such as a 33 millimeter co-rotating twin screw extruder commercially available from APV Chemical Machinery Inc.; affiliated with Davis-Standard, a Crompton Company; Pawcatuck, Conn. or a BRABENDER mixer (commercially available from C. W. Brabender Co.; South Hackensack, N.J.). The compounding temperature is typically from about 100° C. to about 180° C. depending on the melt processing temperature of the exfoliating agent. The compounding temperature should be selected such that it is above the softening point of the exfoliating agent but below the decomposition temperature of the components.

After pre-compounding organophilic clay with the exfoliating agent to produce a master batch, the master batch can be hot melt mixed with the elastomer to produce a hot melt processable PSA composition. Because the final exfoliation of the organophilic clay is much more complete when the organophilic clay is pre-exfoliated prior to mixing with the elastomer, this method may be preferred over the direct mixing of elastomer, organophilic clay, and exfoliating agent.

After the mixing step, whether done in an extruder or a mixer, the composition can be formed into a coating by continuous hot melt forming methods. Continuous forming methods include, for example, drawing the PSA composition out of a film die and subsequently contacting the composition to a moving plastic web or other suitable substrate. A related continuous forming method involves extruding the composition and a co-extruded backing material from a film die and subsequently cooling the construction to form a PSA tape. Other continuous forming methods involve directly contacting the molten composition to a rapidly moving plastic web or other suitable substrate. In this method, the composition can be applied to the moving web using a die having flexible die lips, such as a reverse orifice coating die and/or other contact dies using rotating rods. After forming, the PSA coatings can be solidified by quenching using direct methods, such as chill rolls or water baths, and indirect methods, such as air or gas impingement.

PSA Articles

PSA articles of the invention can be made, for example, by applying the composition of the invention to a substrate by various hot melt coating processes. Any suitable substrate can be used.

A particularly preferred article is a tape. Examples of suitable tapes include, but are not limited to, cloth-backed tapes, paper-backed tapes, film-backed tapes, and transfer tapes. A PSA tape can be prepared by coating a layer of PSA on a backing. The exposed surface of the PSA coating may subsequently be applied to a surface from which it could be released later or directly to the surface to which it is intended to adhere.

A transfer PSA tape can be made by coating the PSA composition between two liners, both of which are coated with a release coating. The release liners often comprise a clear polymeric material such as polyolefin or polyester that is transparent to ultraviolet radiation.

The degree of organophilic clay exfoliation was found to affect adhesive properties of the composition. The exact degree of exfoliation needed, however, depends upon the particular application of compositions of the invention. Preferably, the organophilic clay is effectively exfoliated to a degree such that, when used as the adhesive in a tape according to the present invention, the tape has a 70° C. shear strength that is at least about 50 percent higher, more preferably at least about 100 percent higher, even more preferably at least about 200 percent higher, and most preferably at least about 300 percent higher, than that of a control tape that is otherwise identical except for the control tape being free of organophilic clay, when measured according to ASTM Test Method D3654-88.

Similarly, it is preferred that the organophilic clay is effectively exfoliated to a degree such that, when used as the adhesive in a tape according to the present invention, the tape has a 180° peel adhesion at 75° C. that is at least about 50 percent higher, more preferably at least about 100 percent higher, and most preferably at least about 200 percent higher than that of a control tape that is otherwise identical except for the control tape being free of organophilic clay. Preferably, the tape of the invention has a 180° peel adhesion at 100° C. that is at least about 50 percent higher, more preferably at least about 100 percent higher, and most preferably at least about 200 percent higher than that of a control tape that is otherwise identical except for the control tape being free of organophilic clay. Preferably, the tape of the invention has a 180° peel adhesion at 125° C. that is at least about 50 percent higher, more preferably at least about 100 percent higher, and most preferably at least about 200 percent higher than that of a control tape that is otherwise identical except for the control tape being free of organophilic clay.

Curing

The coated composition may optionally be cured by exposure to, for example, thermal (i.e., heat) or other radiation. If heat is used to cure the composition, a thermal curing agent is preferably included in the composition, preferably one that activates at a temperature above the hot melt processing temperature of the composition. Curing by exposure to ultraviolet radiation is generally preferred. Suitable radiation sources include actinic (such as ultraviolet, for example), electron beam (e-beam), and similar sources. A photocuring agent is generally added to the composition when actinic radiation is employed. Photocuring agents should be selected such that they are compatible with the composition of the invention.

EXAMPLES

These examples are merely for illustrative purposes only and are not meant to be limiting on the scope of the appended claims. All parts, percentages, ratios, etc. in the examples and the rest of the specification are by weight unless indicated otherwise. All reagents are available from Aldrich Chemical Co.; Milwaukee, Wis., unless indicated otherwise.

Table of Abbreviations/Trade Designations

| Abbreviation/Trade Designation | Description |
| --- | --- |
| AA | Acrylic acid |
| CV60 | A Mooney viscosity controlled natural rubber, available from Goodyear Tire and Rubber Co.; Akron, OH |
| ESCOREZ 180 | A tackifying resin useful as an exfoliating agent, available from Exxon Chemical Company; Houston, TX |
| ESCOREZ 1310 | A tackifying resin useful as an exfoliating agent, available from Exxon Chemical Company; Houston, TX |
| IOA | Isooctyl acrylate |
| IOTG | Isooctyl thioglycolate |
| IRGANOX 1010 | An antioxidant, available from Ciba Specialty Chemicals Corp.; Tarrytown, NY |
| IRGANOX B561 | An antioxidant, available from Ciba Specialty Chemicals Corp.; Tarrytown, NY |
| IRGACURE W651 | Photo curing agent 2,2 dimethoxy-2-phenylacetophenone, available from Ciba Specialty Chemicals Corp.; Tarrytown, NY |
| KRATON D1107 | A styrene-isoprene-styrene block copolymer, available from Shell Chemical Co.; Houston, TX |
| MA | Methacrylic acid |
| POLYOCTENE ELASTOMER | Prepared as described in Example 4 of U.S. Pat. No. 5,644,007 |
| RADIAL BLOCK COPOLYMER | A styrene/isoprene block copolymer having a styrene content of 9% by weight as described for polymer B in TABLE 2 of U.S. Pat. No. 5,296,547 |
| RAYON (70P) | RAYON cloth laminated with polyethylene, available as polycoated cloth scrim 40 × 30 thread count, #30 from Itochu International, Incorporated; New York, NY. This backing was corona-treated on both sides and an acrylic-polyurethane low adhesion backsize was applied to one side. |

-continued

Table of Abbreviations/Trade Designations

| Abbreviation/Trade Designation | Description |
| --- | --- |
| REGALREZ 1126 | A tackifying resin useful as an exfoliating agent, available from Hercules Chemical Co.; Wilmington, DE. |
| SCPX CLOISITE 20A | A surface-modified smectite organophilic clay, available from Southern Clay Products; Gonzalez, TX |
| SCPX CLOISITE Na+ | A natural smectite hydrophilic clay, available from Southern Clay Products; Gonzalez, TX |
| TMPTA | Trimethylolpropane triacrylate |
| TRIAZINE CURING AGENT | Triazine photocrosslinker, 2,4-bis-(trichloromethyl)-6-(3',4'-dimethoxyphenyl)-sym-triazine as disclosed in U.S. Pat. Nos. 4,329,384 and 4,330,590 |
| WINGTACK PLUS | A tackifying resin, available from Goodyear Tire and Rubber Co.; Akron, OH |

TEST METHODS

Room and Elevated Temperature 180° Peel Adhesion Tests

This peel adhesion test is similar to the test method described in ASTM D 3330-90, using a glass substrate instead of stainless steel. The peel adhesion is the force required to remove a test sample from a test substrate measured at a specific angle and rate of removal. In the examples, this force is expressed in Newtons/decimeter (N/dm) width of coated sheet. Pressure sensitive adhesive (PSA) tape samples, measuring 1.25 centimeter (width)×15 centimeters (length), were conditioned for greater than 24 hours at approximately 21° C. and 50% relative humidity. These samples were then adhered to the test substrate using one pass of a 2.1 kilogram roller. The samples were then removed at an angle of 180° and a peel rate of 230 centimeters/minute. The removal force was measured using an IMASS Model 3M90 Slip/Peel tester (available from Instrumentors Inc.; Strongsville, Ohio). The room temperature testing was performed at a temperature of approximately 21° C. and 50% relative humidity. For elevated temperature testing, the PSA tape samples were rolled down onto the test substrate at room temperature as described above and allowed to dwell at the specified testing temperature (12 minutes dwell at testing temperatures for glass test substrates) before peel testing.

Adhesive Anchorage

This procedure was used to measure the force necessary to remove a PSA coating from its backing. Samples were cut into 2.5 centimeters wide×20 centimeters long strips. Using a clean steel plate, a 5 centimeters wide strip of double-coated tape (3M™ Double Stick SCOTCH™ Tape, available from Minnesota Mining and Manufacturing Co.; St. Paul, Minn.), with the liner removed, was centered and attached to the plate. With its adhesive side face-up, a tape sample was applied to the double-coated tape. A 24 centimeters length by 1.27 centimeter strip of a test tape (SCOTCH™ No. 56 Electrical Tape, available from Minnesota Mining and Manufacturing Co.; St. Paul, Minn.) was then centered and applied adhesive side down onto the tape sample to form a laminate.

The laminate was then rolled down by one pass of a 2.0 kilogram roller at a rate of 230 centimeters/minutes The remaining length of the test tape (approximately 4 centimeters) was then secured to a stationary load cell such that, with movement of the carriage, a 180° peel angle was obtained. The carriage moved at a rate of 230 centimeters/minutes. The force was reported in Newtons/decimeter (N/dm).

Auto-Adhesion Test

The cohesive strength of the PSA was measured using a 1,750 gram static load. Six samples, conditioned at a controlled temperature and humidity of 21° C., 50% relative humidity for 24 hours, were cut into 1.3 centimeter wide by 15.2 centimeters long strips. The ends of the strips were attached, forming a 1.3 centimeter×1.3 centimeter adhesive bonding area and rolled down with six passes of a 300 gram roller. The other ends of the strips were wound around brass hooks and stapled. One brass hook was attached to a stationary peg, while the other was attached to a 1,750 gram weight. When the samples debonded from one another, the weight fell, activating a shut-off timer. The average time until shut-off for the two samples was reported as the Auto-Adhesion.

Room and Elevated Temperature Shear Strength Tests

These shear strength tests are similar to that described in ASTM D 3654-88 and are measured in units of time (minutes) required to pull a standard area of PSA tape from a stainless steel substrate under constant stress.

Each tape sample was conditioned for greater than 24 hours at approximately 21° C. and 50% relative humidity. These samples were then tested for shear strength from a clean stainless steel substrate. The tape samples, measuring 1.25 centimeter (width)×2.5 centimeters (length), were adhered to the stainless steel substrate using four passes of a 2.1 kilogram roller. For testing at room temperature (21° C.), the taped substrate was placed in a vertical holding rack and a static, 500 gram load was attached to the tape at an angle of 180 degrees. The time it took for the load to drop was measured in minutes. For testing at elevated temperature (70° C. or 93° C., as noted in the particular example), the taped substrate was placed in a vertical holding rack and conditioned at that temperature for fifteen minutes before a static, 500 gram weight was hung from each sample. At both test temperatures, the time it took for the weight to drop was recorded in minutes. For those samples still adhering to the substrate after 4,000 minutes (70° C.) or 7,000 minutes (93° C.), the test was discontinued. Two samples specimens of each tape were tested. The shear strengths obtained from each sample were averaged to obtain the reported shear strength.

Low Stress Peel Adhesion Strength

Low Stress Peel Adhesion Strength, as determined by holding time, was measured on PSA tape samples at room temperature (21° C.). A tape sample, measuring 1.90 centimeter (width)×10.2 centimeters (length), was adhered to a stainless steel substrate, measuring 10.2 centimeters long, using four passes of a 2.1 kilogram roller each after being conditioned for greater than 24 hours at approximately 21° C. and 50% relative humidity. Each taped substrate was placed on the bottom side of a horizontal holding rack with the taped side facing down and a static load of 200 grams was attached to the tape at an angle of 90°. The time it took for the load to drop was measured in minutes and is reported as the Low Stress Peel Adhesion Strength. For those samples still adhering to the substrate after 5,500 minutes, the test was discontinued.

T-Peel Adhesion

This test was performed according to ASTM D3330-87, except as specified. A strip of foam tape, measuring 11.43 centimeters by 1.27 centimeters wide, was laminated between two anodized aluminum strips (10.16 centimeters long by 1.59 centimeters wide by 0.127 mm. thick). The laminated test sample was conditioned for at least one hour at room temperature (21° C.) and then tested for cohesive strength using an INSTRON Tensile tester (available from Instron Corp.; Canton, Mass.) with a 180° peel and a crosshead speed of 76.2 centimeters/minutes (30.48 inches per minute). The average value from testing five different samples is reported as the T-Peel Adhesion value.

Removability After Temperature Aging

Removability of a PSA tape from a test panel, after aging at elevated temperature, was determined by observing the amount of residual adhesive present on the panel upon removal of the tape after exposure to elevated temperatures. The tape sample and a zinc phosphate treated, cold roll steel panel (ACT APR 15461 from ACT Laboratories, Incorporated; Hillsdale, Mich.) were conditioned for greater than 24 hours at approximately 21° C. and 50% relative humidity. The tape sample, measuring 1.27 centimeters (width)×10.2 centimeters (length), was then adhered to the cold roll steel panel, which measured 10.2 centimeters (width)×20.3 centimeters (length)×0.08 centimeters (thickness), using four passes of a 2.1 kilogram roller. The taped substrate was placed in a 218° C. oven for 30 minutes. After 30 minutes, the oven door was opened and a 2.2 centimeters length of the tape was peeled from the hot substrate by hand at an angle of 180°. The partially de-taped substrate was then removed from the oven, allowed to cool to 54° C., at which time another 2.2 centimeters length of the tape was peeled from the substrate by hand at an angle of 180°. The partially de-taped substrate was then allowed to cool to room temperature (21° C.), at which time another 2.2 centimeters length of the tape was peeled from the substrate by hand at an angle of 180°. The partially de-taped substrate was then allowed to stand for 24 hours at 21° C. and 50% relative humidity, at which time another 2.2 centimeters length of tape was peeled from the substrate by hand at an angle of 180°. The amount of adhesive residue remaining in each of the four areas of the de-taped substrate was visually estimated by eye and reported as the Removability Index on a linear scale of 0 to 5 (0=no residue, 5=complete adhesive transfer to the substrate) for each of the four areas (218° C., 54° C., 21° C. and 24 hours at 21° C.). "Clean Removal" according to this test is where the adhesive residue remaining in each area of the de-taped substrate had a Removability Index of about 0.5 or less.

Polyoctene Elastomer Synthesis

For this method, the cocatalyst solution was $AlEt_3$-heptane and purified 1-octene in a ratio of 66:1000, and the catalyst suspension was LYNX 900 catalyst and hexane in a ratio of 63.6:10,000. Purified 1-octene (at a rate of 350.0 g/min), cocatalyst solution (at a rate of 22.13 g/min), and the catalyst suspension (at a rate of 25.30 g/min) were fed into a 20L capacity Stirred Tubular Reactor (STR) described in U.S. Pat. No. 5,644,007. The purified 1-octene and cocatalyst solution were merged through a T-pipe connector, preheated to approximately 70° C., and pressure fed into the STR. The catalyst suspension, continuously stirred under $N_2$ to prevent stratification and oxygen contamination, was introduced by peristaltic pump. The temperature of the reaction mixture in each section of the STR was maintained at approximately 70° C. The quenched reaction mixture was collected, volatile components were removed, and the intrinsic viscosity (I.V.) of the polymer was measured to be 2.0 dL/g.

Exfoliation of Organophilic Clay Using Exfoliating Agent

Exfoliated Organophilic Clay 1

An exfoliated organophilic clay was prepared by feeding 20 parts SCPX CLOISITE 20A organophilic clay and 80 parts ESCOREZ 1310 exfoliating resin into a 33 millimeter diameter co-rotating twin screw extruder (available as Model MP2030TC from APV Chemical Machinery, Inc., affiliated with Davis-Standard; a Crompton Company; Pawcatuck, Conn.) having a 68.6 centimeters screw and a 160° C. die temperature. The screw speed was 200 rpm and the barrel zone temperatures were controlled to be 38° C. (zone 1), 93° C. (zone 2), 121° C. (zone 3), 135° C. (zone 4), and 160° C. (zones 5–12). The rate of output of exfoliated organophilic clay was 3.6 kg/hr. The clay content was 25% by weight.

Exfoliated Organophilic Clay 2

The same extruder and the same process used to prepare Exfoliated Organophilic Clay 1 was used to prepare an exfoliated organophilic clay except one containing SCPX CLOISITE 20A organophilic clay with ESCOREZ 180 exfoliating resin. The clay content was 40% by weight.

Exfoliated Organophilic Clay 3

The same extruder and the same process used to prepare Exfoliated Organophilic Clay 1 was used to prepare an exfoliated organophilic clay except one containing SCPX CLOISITE 20A organophilic clay with REGALREZ 1126 exfoliating resin. The clay content was 40% by weight.

Examples 1–3 and Comparative Example C1

These Examples show the effect of the addition of an organophilic clay to a natural rubber PSA on the adhesive performance at room temperature and elevated temperature. Tackified natural rubber PSAs containing exfoliated organophilic clay were prepared using a 30 millimeter diameter, fully intermeshing, co-rotating twin-screw extruder (available from Werner & Pfleiderer Co.; Ramsey, N.J.). Into the throat of the extruder, the following ingredients, in the amounts shown in Table 1, were fed in sequential order: CV 60; a mixture of the IRGANOX 1010, the SCPX CLOISITE 20A, and two-thirds of the ESCOREZ 1310; and then the remaining one-third of the ESCOREZ 1310. The temperatures of the extruder zones were progressively increased from 50° C. to 105° C. The melt mixture was passed through a 15.2 centimeters wide contact die onto a RAYON (70P) cloth backing. The die was maintained at 150° C. and the die gap was 0.5 millimeters to 0.8 mm. A coated adhesive thickness of 127 micrometers was obtained. The adhesive side of the tape was then irradiated with 4 Megarads (Mrads) at 175 kiloVolts (kV) using an ELECTROCURTAIN CB-300 electron beam system (available from Energy Sciences, Incorporated, Wilmington, Mass.). The resulting adhesive tape was then evaluated according to previously described test methods.

COPOLYMER. The RADIAL BLOCK COPOLYMER had number average molecular weights (all in grams/mole) of 4,000 and 21,500 for the two endblocks, 135,400 for the arm, and 1,087,000 for the star. The RADIAL BLOCK COPOLYMER was processed into dried crumbs suitable for extrusion or other processing. The composition ingredients were fed into the extruder in sequential order as described in Examples 1–3 and C1, in the amounts shown in Table 3. The temperatures of the extruder zones were progressively increased from 50° C. to 105° C. The melt mixture was

TABLE 1

| Ex. | CV60 (parts) | ESCO-REZ 1310 (parts) | IRGANOX 1010 (parts) | SCPX CLOISITE 20A (parts) | Room Temperature 180° Peel Adhesion (N/dm) | Adhesive Anchorage (N/dm) | Auto-Adhesion (minutes) |
|---|---|---|---|---|---|---|---|
| C1 | 54.4 | 44.5 | 1.1 | 0 | 28.4 | 123.6 | 43 |
| 1 | 52.8 | 43.2 | 1.1 | 3 | 31.7 | 130.2 | 63 |
| 2 | 51.1 | 41.8 | 1.0 | 6 | 35.0 | 132.4 | 76 |
| 3 | 49.0 | 40.0 | 1.0 | 10 | 97.4 | 175.0 | 68 |

Examples 1–2 and Comparative Example C1 were further tested. The results of these tests are shown in Table 2.

TABLE 2

| Ex. | SCPX CLOISITE 20A (parts) | 180° Peel Adhesion at 50° C. (N/dm) | 180° Peel Adhesion at 75° C. (N/dm) | 180° Peel Adhesion at 100° C. (N/dm) | 180° Peel Adhesion at 125° C. (N/dm) | Shear Strength at 70° C. (minutes) |
|---|---|---|---|---|---|---|
| C1 | 0 | 24.5 | 10.5 | 14.0 | 10.5 | 31 |
| 1 | 3 | 24.5 | 21.0 | 28.0 | 28.0 | 118 |
| 2 | 6 | 31.5 | 21.0 | 28.0 | 35.0 | 238 |

Examples 4–6 and Comparative Example C2

These Examples show the effect of the addition of an organophilic clay to a radial block copolymer PSA on the adhesive performance at room temperature and elevated temperature. Tackified radial block copolymer PSAs containing exfoliated organophilic clay were prepared in the same fashion as described in Examples 1–3 and Comparative Example C1 with the following modification, the CV 60 natural rubber was replaced by a RADIAL BLOCK passed through a 15.2 centimeters wide contact die and onto a cast, 94 micrometers thick polypropylene film backing. The die was maintained at 150° C. and the die gap was 0.5 millimeters to 0.8 mm. A coated adhesive thickness of 127 micrometers was obtained. The adhesive side of the tape was then irradiated with 4 Megarads (Mrads) at 175 kiloVolts (kV) using an ELECTROCURTAIN CB-300 electron beam system (available from Energy Sciences, Incorporated; Wilmington, Mass.). The PSA tapes were evaluated according to previously described test methods.

TABLE 3

| Ex. | RADIAL BLOCK COPOLYMER (parts) | ESCOREZ 1310 (parts) | IRGANOX 1010 (parts) | SCPX CLOISITE 20A (parts) | Shear Strength at 93° C. (minutes) | Low Stress Peel Adhesion Strength (minutes) |
|---|---|---|---|---|---|---|
| C2 | 57.2 | 41.6 | 1.1 | 0 | 5,171 | 6 |
| 4 | 55.5 | 42.7 | 1.1 | 0.7 | 7,000 | 8 |
| 5 | 53.8 | 43.8 | 1.1 | 1.3 | 7,000 | 17 |
| 6 | 51.5 | 45.3 | 1.0 | 2.2 | 7,000 | 48 |

Examples 7–12 and Comparative Examples C3–C5

These Examples demonstrate the effects of exfoliation of the organophilic clay prior to compounding with a tackified natural rubber PSA formulation on the maximum viscosity of the adhesive formulation as well as the time needed to reach the maximum viscosity. All PSAs contained 50 parts of CV60, 50 parts of ESCOREZ 1310, and 1 part of IRGANOX 1010. Comparative Examples C3–C5 and Examples 7–9 were prepared by mixing the components in a BRABENDER batch mixer (available from C. W. Brabender Instruments; South Hackensack, N.J.) operating at 80 rpm and 160° C. and adding the clay (either SCPX CLOISITE 20A or SCPX CLOISITE Na+) directly with this pre-mixed PSA. In Examples 10–12, Exfoliated Organophilic Clay 1 was compounded with a pre-mixed PSA containing less than 50 parts of ESCOREZ 1310 (as shown in Table 4, the balance of the 50 parts ESCOREZ 1310 was supplied by the Exfoliated Organophilic Clay 1). The amounts of ingredients used are shown in Table 4. Under the specified mixing conditions, the time (in minutes) to reach maximum viscosity (as indicated by the torque of the batch mixer) as well as the maximum viscosity value were recorded. The results of these tests are recorded in Table 4. Elevated Temperature Shear Strength and Auto-Adhesion tests were carried out for Examples C3, C5 and 8. The data is recorded in Table 5.

millimeter thick, ethylene vinyl acetate copolymer (VA-24 Film, available from Pliant Corporation; Dallas, Tex.). The packages were immersed in a water bath and exposed to ultraviolet radiation at an intensity of 3.5 milliWatts per centimeter squared and a total energy of 1,627 milliJoules per centimeter squared, as measured in NIST units, to form a packaged PSA.

The resulting adhesive had an I.V. of about 1.1 dL/gram. This packaged adhesive composition was fed into a 51 millimeters single screw BONNOT extruder (available from The Bonnot Company; Uniontown, Ohio) at 105° C. The extrudate was fed into 30 millimeters co-rotating twin screw extruder (Model ZSK 30, commercially available from Werner & Pfleiderer; Ramsey, N.J.) and compounded with Exfoliated Organophilic Clay 2 at a screw speed of 200 rpm with a flow rate of about 4.5 kilograms/hour and a temperature of 110° C. The feed ratios were adjusted so that the packaged adhesive composition was fed at about 5.67 times the rate of the Exfoliated Organophilic Clay 2 composition, translating to about 6 weight % exfoliated organophilic clay content in the PSA composition. Expandable polymeric microspheres, having a shell composition containing acrylonitrile and methacrylonitrile (F100D, available from Pierce & Stevens Corp.; Buffalo, N.Y.) were added downstream in an amount of about 1.5 parts per 100 parts organophilic clay-containing PSA composition.

The hose and die temperatures were set at 193° C. The extrudate was pumped to a 15.24 centimeters wide drop die

TABLE 4

| Ex. | SCPX CLOISITE 20A (parts) | SCPX CLOISITE Na+ (parts) | Exfoliated Organophilic Clay 1 (parts) | Clay Content (weight %) | Maximum Torque (mg)* | Mixing Time to Achieve Maximum Torque (minutes) |
| --- | --- | --- | --- | --- | --- | --- |
| C3 | 0 | 0 | 0 | 0 | 200 | 19 |
| C4 | 0 | 3 | 0 | 3 | 255 | 22 |
| C5 | 0 | 6 | 0 | 6 | 310 | 21 |
| 7 | 3 | 0 | 0 | 3 | 380 | 28 |
| 8 | 6 | 0 | 0 | 6 | 480 | 30 |
| 9 | 9 | 0 | 0 | 9 | 490 | 24 |
| 10 | 0 | 0 | 15 | 3 | 400 | 26 |
| 11 | 0 | 0 | 30 | 6 | 670 | 6 |
| 12 | 0 | 0 | 45 | 9 | 670 | 5 |

*as noted on the BRABENDER equipment

TABLE 5

| Example | Shear Strength at 70° C. (minutes) | Auto-Adhesion (minutes) |
| --- | --- | --- |
| C3 | 9.7 | 4.5 |
| C5 | 38.0 | 19.5 |
| 8 | 93.8 | 550.4 |

Example 13 and Comparative Example C6

The same procedure was followed for Comparative Example C6 and Example 13 with the exception that, for Comparative Example C6, no organophilic clay was used. Example 13 illustrates the effect of the addition of an organophilic clay to a foamed PSA. A PSA composition was prepared by mixing 95 parts of IOA, 5 parts of AA, 0.15 part IRGACURE W651, and 0.03 part of IOTG. The composition was placed into packages measuring approximately 10 centimeters by 5 centimeters by 0.5 centimeters as described in U.S. Pat. No. 5,804,610. The packaging film was a 0.0635 that was shimmed to a thickness of 1.016 mm. The resulting foam sheets had a thickness of about 1 mm. The extruded sheet was cast onto a chill roll that was set at 7° C., cooled to about 25° C., and then transferred onto a 0.127 millimeters thick polyethylene release liner. After cooling, the extruded foam sheets were transferred to a 0.127 millimeters thick polyethylene film and crosslinked using an ELECTROCURTAIN CB-300 electron beam system (available from Energy Sciences, Incorporated; Wilmington, Mass.) operating at an accelerating voltage of 300 kiloVolts and at a speed of 6.1 meters per minute. The measured electron beam dose was 4 Megarads (Mrads). All of the foams were tacky.

The foam sheets were laminated to a two-layer film adhesive, using pressure from a nip roll, to make a tape. The first layer of the film adhesive was prepared by dissolving 10 parts polyamide (MACROMELT 6240, from Henkel of America, Inc.; Gulph Mills, Pa.) in a solvent blend of 50 parts isopropanol and 50 parts n-propanol, coating the solution onto a release liner, and drying in an oven at 121° C. for about 15 minutes. The second layer of the film adhesive was a solvent-based PSA having a composition of 65 parts IOA, 30 parts MA, and 5 parts AA, made according to the method disclosed in U.S. Reissue Pat. No. 24,906. A release liner was then placed over the solvent-based PSA, and the polyamide side of the film adhesive was pressure-laminated to the foam. The tapes were tested for T-Peel Adhesion as described above. The results of these tests are found in Table 6.

20A and REGALREZ 1126) was fed into the extruder in the levels shown in Table 6, along with 2 parts IRGANOX B561, 0.2 part TRIAZINE CURING AGENT and 5 parts TMPTA. The screw speed for each Example is shown in Table 7.

TABLE 6

| Ex. | Acrylate (parts) | ESCOREZ 180 (parts) | Exfoliated Organophilic Clay 2 (parts) | Clay (weight %) | Thickness (micrometers) | T-Peel Adhesion (N/dm) |
|---|---|---|---|---|---|---|
| 15 | 85 | 9* | 15 | 6 | 1,143 | 868 |
| C6 | 91 | 9 | 0 | 0 | 1,143 | 496 |

*contributed by Exfoliated Organophilic Clay 2

Examples 14–23 and Comparative Examples C7–C11

Polyoctene elastomer was fed into a co-rotating fully intermeshing twin screw extruder (Model ZSK 30 commercially available from Werner & Pfleiderer; Ramsey, N.J.) with a 30 millimeter diameter and a 26:1 (length:diameter) ratio at 177° C. REGALREZ 1126 and Exfoliated Organophilic Clay 3 (a pre-exfoliated mixture of SCPX CLOISITE The molten mixture was coated onto a 25 micrometer thick PET film at a coating thickness of 29.3 grams/meter squared. The coated films were passed under a medium pressure mercury UV lamp (commercially available from Fusion Systems; Gaithersburg, Md.) at the dosages shown in Table 7. The tape samples were then tested according to the Removability After Temperature Aging test. The results of these tests are shown in Table 8.

TABLE 7

| Ex. | Polyoctene Elastomer (parts) | Total REGALREZ 1126 (parts) | Exfoliated Organophilic Clay 3 (parts) | Clay Content (parts) | Screw Speed (rpm) | UV dose (mJ/centi meters$^2$) |
|---|---|---|---|---|---|---|
| C7 | 67.8 | 25.0 | 0 | 0 | 100 | 600 |
| 14 | 65.4 | 25.5 | 5.0 | 2.0 | 100 | 600 |
| 15 | 62.8 | 26.0 | 10.0 | 4.0 | 100 | 600 |
| C8 | 67.8 | 25.0 | 0 | 0 | 200 | 200 |
| 16 | 65.4 | 25.5 | 5.0 | 2.0 | 200 | 200 |
| 17 | 62.8 | 26.0 | 10.0 | 4.0 | 200 | 200 |
| C9 | 67.8 | 25.0 | 0 | 0 | 300 | 200 |
| 18 | 65.4 | 25.5 | 5.0 | 2.0 | 300 | 200 |
| 19 | 62.8 | 26.0 | 10.0 | 4.0 | 300 | 200 |
| C10 | 67.8 | 25.0 | 0 | 0 | 200 | 400 |
| 20 | 65.4 | 25.5 | 5.0 | 2.0 | 200 | 400 |
| 21 | 62.8 | 26.0 | 10.0 | 4.0 | 200 | 400 |
| C11 | 67.8 | 25.0 | 0 | 0 | 300 | 400 |
| 22 | 65.4 | 25.5 | 5.0 | 2.0 | 300 | 400 |
| 23 | 62.8 | 26.0 | 10.0 | 4.0 | 300 | 400 |

TABLE 8

| Ex. | Removability Index at 218° C. | Removability Index at 54° C. | Removability Index at 21° C. | 24 hour Removability Index at 21° C. |
|---|---|---|---|---|
| C7 | 2 | 2 | 1 | 0.5 |
| 14 | 1 | 1 | 0.5 | 0.5 |
| 15 | 1 | 0.5 | 0.5 | 0.5 |
| C8 | 2 | 2 | 0.5 | 0.5 |
| 16 | 1 | 1 | 0 | 0 |
| 17 | 1 | 0 | 0 | 0 |
| C9 | 1 | 1 | 0.5 | 0.5 |
| 18 | 1 | 1 | 0.5 | 0.3 |
| 19 | 0 | 0 | 0 | 0 |
| C10 | 2 | 2 | 0 | 0 |
| 20 | 1 | 1 | 0 | 0 |
| 21 | 1 | 0.5 | 0 | 0 |
| C11 | 1 | 1 | 0.5 | 0.5 |

TABLE 8-continued

| Ex. | Removability Index at 218° C. | Removability Index at 54° C. | Removability Index at 21° C. | 24 hour Removability Index at 21° C. |
|---|---|---|---|---|
| 22 | 1 | 1 | 0.5 | 0.3 |
| 23 | 1 | 0.5 | 0.3 | 0.3 |

Reasonable variations and modifications are possible from the foregoing disclosure without departing from either the spirit or scope of the present invention as defined in the claims. For example, it should be noted that steps recited in any method claims below do not necessarily need to performed in the order that they are recited. Those of ordinary skill in the art will recognize variations in performing the steps from the order in which they are recited. For example, in certain embodiments, steps may be performed simultaneously. The accompanying claims should be constructed with these principles in mind.

What is claimed is:

1. A composition comprising:
   at least one elastomer;
   organophilic clay plate-like particles; and
   at least one non-volatile organophilic exfoliating agent;
   wherein the composition is a hot melt processable pressure sensitive adhesive.

2. The composition of claim 1, wherein the at least one elastomer is selected from natural rubbers, synthetic rubbers, polyvinyl ethers, polyacrylates, polyurethanes, poly-α-olefins, silicones, and combinations thereof.

3. The composition of claim 1, wherein the elastomer comprises a thermoplastic elastomer.

4. The composition of claim 1, wherein the elastomer comprises a thermoplastic elastomer selected from styrenic block copolymers, polyolefins, polyurethanes, polyesters, and combinations thereof.

5. The composition of claim 1, wherein the organophilic clay plate-like particles comprise organophilically modified versions of hydrated aluminum silicate, kaolinite, atapulgite, illite, bentonite, halloysite, beidelite, nontronite, hectorite, hectite, saponite, montmorillonite, and combinations thereof.

6. The composition of claim 1, wherein the non-volatile organophilic exfoliating agent comprises a resin having a number average molecular weight of less than about 20,000 g/mol.

7. The composition of claim 1, wherein the non-volatile organophilic exfoliating agent comprises a tackifying agent.

8. The composition of claim 1, comprising:
   about 25 to about 98 weight percent of the at least one elastomer;
   about 1 to about 40 weight percent of the organophilic clay plate-like particles; and
   about 1 to about 75 weight percent of the non-volatile organophilic exfoliating agent;
   wherein the weight percentages are based upon the total weight of the composition.

9. An article comprising:
   a substrate; and
   the composition of claim 1 coated on at least a portion of the substrate.

10. The article of claim 9, wherein the article comprises a tape.

11. The article of claim 10, wherein the tape has a Clean Removal according to the Removability After Temperature Aging Test.

12. The article of claim 10, wherein the tape has a 70° C. Shear Strength in minutes, when measured according to ASTM Test Method D3654-88, that is at least about 100 percent higher than that of a control tape that is otherwise identical except for the control tape being free of organophilic clay.

13. The article of claim 10, wherein the tape has a 180° Peel Adhesion at 75° C. that is at least about 50 percent higher than that of a control tape that is otherwise identical except for the control tape being free of organophilic clay.

14. The article of claim 10, wherein the tape has a 180° Peel Adhesion at 100° C. that is at least about 50 percent higher than that of a control tape that is otherwise identical except for the control tape being free of organophilic clay.

15. The article of claim 10, wherein the tape has a 180° Peel Adhesion at 125° C. that is at least about 50 percent higher than that of a control tape that is otherwise identical except for the control tape being free of organophilic clay.

16. A composition comprising:
   at least one elastomer;
   organophilic clay plate-like particles; and
   at least one non-volatile organophilic exfoliating agent;
   wherein the organophilic clay plate-like particles are oriented and wherein the composition is a hot melt processable pressure sensitive adhesive.

17. The composition of claim 16, wherein the organophilic clay plate-like particles are uniaxially oriented.

18. The composition of claim 16, wherein the organophilic clay plate-like particles are biaxially oriented.

19. A method comprising the step of:
   combining, in a solventless manner and in any order, components comprising:
      at least one elastomer;
      at least one organophilic clay; and
      at least one non-volatile organophilic exfoliating agent; and
   shear mixing the components in any order at a sufficient temperature to form a hot melt processable, pressure sensitive adhesive composition comprising organophilic clay plate-like particles.

20. The method of claim 19, comprising the step of further hot melt processing the composition.

21. The method of claim 19, further comprising the step of curing the composition.

22. A solventless method comprising the steps of:
   shear mixing at least one organophilic clay and at least one non-volatile organophilic exfoliating agent at a sufficient temperature in order to form a composition comprising organophilic clay plate-like particles and the non-volatile organophilic exfoliating agent; and
   mixing the composition with an elastomer at a sufficient temperature in order to form a hot melt processable, pressure sensitive adhesive composition comprising organophilic clay plate-like particles.

23. The method of claim 22, comprising the step of further hot melt processing the composition.

24. The method of claim 22, further comprising the step of curing the composition.

* * * * *